United States Patent Office.

JOHN WINGER, OF KANSAS CITY, MISSOURI.

Letters Patent No. 112,879, dated March 21, 1871.

IMPROVEMENT IN COMPOSITIONS FOR STAINING WOOD.

The Schedule referred to in these Letters Patent and making part of the same.

*To all whom it may concern:*

Be it known that I, JOHN WINGER, of Kansas City, in the county of Jackson and State of Missouri, have invented a new and useful Improvement in Composition for Staining Wood; and I do hereby declare that the following is a full, clear, and exact description thereof, which will enable others skilled in the art to make and use the same.

This invention relates to a new and useful improvement in a composition for staining wood of the color of black walnut, and consists in combining the ingredients hereinafter named in about the proportions specified.

In carrying out my invention and discovery I take of water, say, four gallons, to which I add one pound extract hemlock bark, four ounces of concentrated lye, two ounces extract of logwood, and one-half ounce of copperas.

The whole being put in a kettle or boiler, heat is applied until the liquid reaches the boiling point.

When cool the composition may be packed or put up in bottles, and is ready for use, and will give a walnut stain to wood or to any substance which will absorb it.

A dark or light stain or shade is given by increasing or diminishing the quantity of copperas used.

This composition gives to wood a beautiful and durable dark stain for imitating black walnut, and costs but a trifle compared with the stains sold in market for the same purpose.

Having thus described my invention,

I claim as new and desire to secure by Letters Patent—

The above-described staining composition, substantially as specified, for the purposes set forth.

JOHN WINGER.

Witnesses:
   O. M. ALBRIGHT,
   ROBERT GOUR.